3,472,854
1-[(BENZIMIDAZOLYL)-LOWER-ALKYL]-
4-SUBSTITUTED-PIPERAZINES
Sydney Archer, Bethlehem, N.Y., assignor to Sterling Drug
  Inc., New York, N.Y., a corporation of Delaware
No Drawing. Continuation-in-part of application Ser. No.
  481,075, Aug. 19, 1965, which is a continuation-in-part
  of application Ser. No. 254,475, Jan. 28, 1963. This
  application May 29, 1967, Ser. No. 642,171
        Int. Cl. C07d 57/00; A61k 27/00
U.S. Cl. 260—268                                  6 Claims

ABSTRACT OF THE DISCLOSURE

New 1-[(benzimidazolyl)-lower-alkyl] - 4 - substituted-piperazines indicated to be useful as tranquilizers, sedatives, skeletal muscle relaxants, adrenolytics, hypothermic agents, anti-convulsants, hypotensives, and cardiovascular agents.

---

This application is a continuation-in-part of my copending application Ser. No. 481,075, filed Aug. 19, 1965, now U.S. Patent 3,362,956, patented Jan. 9, 1968, which in turn is a continuation-in-part of my prior application Ser. No. 254,475, filed Jan. 28, 1963, and now abandoned.

This invention relates to certain 1-[(benzimidazolyl)-lower-alkyl]-4-substituted-piperazines, their acid-addition and quaternary ammonium salts, and to intermediates and processes therefor.

The compounds of the invention are represented by the general formula:

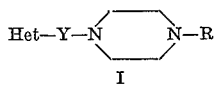

I wherein R is hydrogen or a lower-alkyl, hydroxy-lower-alkyl, phenyl, phenyl-lower-alkyl, benzhydryl, phenyl-lower-alkenyl, cycloalkyl-lower-alkyl, or pyridyl radical; Y is lower-alkylene of from one to six carbon atoms; and Het is a 1- or 2-benzimidazolyl radical.

In the above general Formula I, when R represents a lower-alkyl radical, it can be straight or branched and can contain from one to about six carbon atoms and thus stands, inter alia, for methyl, ethyl, isobutyl, n-hexyl, and the like.

When R represents an hydroxy-lower-alkyl radical, it can be straight or branched, can contain from two to six carbon atoms and is such that the oxygen atom of the hydroxy-lower-alkyl group and the nitrogen atom of the piperazine ring are separated by at least two carbon atoms. R thus also stands, inter alia, for 2-hydroxyethyl, 3-hydroxy-1-methylpropyl, 6-hydroxyhexyl, and the like.

When R represents cycloalkyl-lower-alkyl, the cycloalkyl moiety contains from three to seven ring carbon atoms, while the lower-alkyl moiety contains from one to four carbon atoms. R thus also stands for cyclopropylmethyl, cyclobutylmethyl, cyclopentylmethyl, cycloheptylmethyl, 2-cyclohexylethyl, and the like.

When R represents phenyl, phenyl-lower-alkyl, benzhydryl, or phenyl-lower-alkenyl, the benzene ring of said radicals can be unsubstituted or can bear one or more substituents of low molecular weight and of such nature that they do not interfere with or take part in the reactions, to be described hereinafter, used in the preparation of the compounds. Moreover, the nucleus of the group, Het, can also be further substituted by one or more of such substituents. Examples of such substituents include halogen (including fluorine, chlorine, bromine, and iodine), lower-alkyl, hydroxy, lower-alkoxy, methylenedioxy, ethylenedioxy, lower-alkylmercapto, lower-alkylsulfinyl, lower-alkylsulfonyl, nitro, lower-alkanoyl, sulfamyl, trifluoromethyl, and the like.

When R represents a phenyl-lower-alkyl radical, the lower-alkyl moiety of said radical can contain from one to four carbon atoms, and when R represents a phenyl-lower-alkenyl radical, the lower-alkenyl moiety of said radical can contain from three to four carbon atoms. Thus R represents, inter alia, phenyl, benzyl, phenethyl, 4-phenylbutyl, benzhydryl, or cinnamyl, or such radicals substituted in the benzene ring by one or more substituents of the nature described above.

In the above general Formula I, the group Y represents lower-alkylene of from one to six carbon atoms, can be straight or branched, and when the group Y is attached to a nitrogen atom of the heterocyclic group, Het, is such that at least two carbon atoms separate the nitrogen atoms of the heterocyclic group and the piperazine ring. The lower-alkylene group, Y, thus stands, inter alia, for methylene, 1,2-ethylene, 1,3-propylene, 2-methyl-1,4-butylene, 1,6-hexylene, and the like.

The compounds of Formula I can also be substituted on the carbon atoms of the piperazine ring by one or more lower-alkyl radicals each containing from one to four carbon atoms.

The compounds of Formula I where Het is a 1-benzimidazolyl radical are prepared by reacting a 2-nitro-N-(halo-lower-alkyl)aniline with a 1-substituted-piperazine. The reaction is preferably carried out at a temperature in the range from about 50° C. to about 175° C. in the presence of an acid-acceptor, the purpose of which is to take up the hydrogen halide split out during the course of the reaction. The acid-acceptor is a basic substance which forms preferably water-soluble by-products easily separable from the main product of the reaction and includes such substances as alkali metal salts of weak acids, e.g. sodium carbonate, sodium acetate, sodium alkoxides, and the like. The acid-acceptor can also be in the form of an excess quantity of the 1-substituted-piperazine. The nitro group of the resulting 1-[(2-nitrophenylamino)-lower-alkyl]-4-substituted-piperazine derivative is reduced with hydrogen over a suitable catalyst, for example palladium-on-charcoal or Raney nickel, in an organic solvent inert under the conditions of the reaction, for example a lower-alkanol, to give the corresponding 1-[(2-amino-phenylamino)-lower-alkyl] - 4 - substituted - piperazine derivative. Reaction of the latter with formic acid affords the compounds of Formula I where Het is a 1-benzimidazolyl radical. The latter reaction is preferably carried out using excess formic acid as the solvent at the reflux temperature of the medium. The procedure is illustrated by the following reaction sequence where R and Y have the meanings given above, and Hal represents halogen.

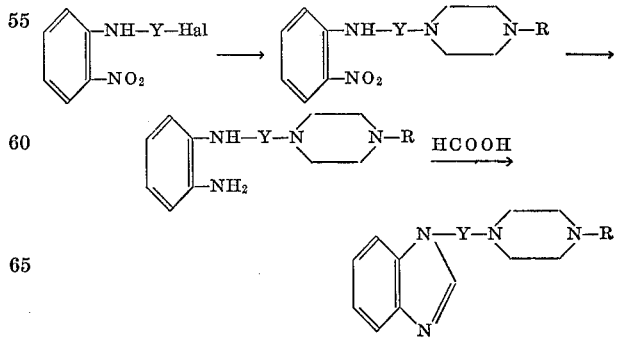

The 2-nitro-N-(halo-lower-alkyl)anilines required as starting materials are prepared by reacting a 2-halo-nitrobenzene with an amino-lower-alkanol to give a 2-nitro-N-

(hydroxy-lower-alkyl)aniline which is then reacted with a halogenating agent, for example a thionyl halide, to give the desired 2-nitro-N-(halo-lower-alkyl)aniline.

The compounds of Formula I where Het is a 2-benzimidazolyl radical are prepared by reacting a 1-(cyano-loweralkyl)-4-substituted-piperazine with an o-phenylenediamine in the presence of a lower-alkanol and anhydrous hydrogen chloride. The reaction is preferably carried out in an organic solvent inert under the conditions of the reaction, for example chloroform, ethylene dichloride, benzene, and the like. The procedure is illustrated by the following reaction sequence where R and Y have the meanings given above:

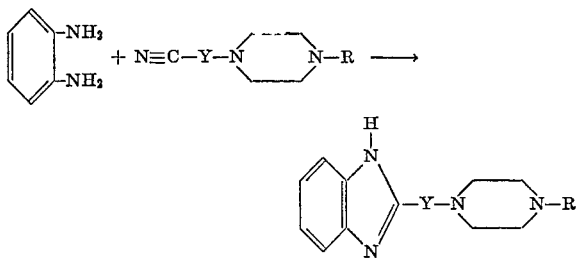

The 1-(cyano-lower-alkyl)-4-substituted-piperazines required as starting materials are prepared by reacting a 1-substituted-piperazine with a halo-lower-alkyl-nitrile preferably in the presence of an acid-acceptor. The nitriles where Y is 1,2-ethylene are conveniently prepared by reacting a 1-substituted-piperazine with acrylonitrile.

The novel compounds of the instant invention are the bases of Formula I and the acid-addition and quaternary ammonium salts of said bases, and said acid-addition and quaternary ammonium salts are considered to be the full equivalents of the free bases. The compounds of the invention in free base form are converted to the acid-addition salt form by interaction of the base with an acid. In like manner, the free bases can be regenerated from the acid-addition salt form in the conventional manner, that is, by treating the salts with strong aqueous bases, for example alkali metal hydroxides, alkali metal carbonates and alkali metal bicarbonates. The bases thus regenerated can then be interacted with the same or a different acid to give back the same or a different acid-addition salt. Thus the novel bases and all of their acid-addition salts are readily interconvertible.

The quaternary ammonium salts are obtained by the addition of esters of strong acids to the free base form of the compounds, said esters having a molecular weight less than about 200. A preferred class of esters comprises alkyl, alkenyl, and monocarbocyclic aryl-lower-alkyl esters of strong inorganic acids or organic sulfonic acids, including such compounds as methyl chloride, methyl bromide, methyl iodide, ethyl bromide, propyl chloride, allyl chloride, allyl bromide, methyl sulfate, methyl benzenesulfonate, methyl p-toluenesulfonate, benzyl chloride, benzyl bromide, and substituted benzyl halides, such as p-chlorobenzyl chloride, p-nitrobenzyl chloride, p-methoxybenzyl chloride, o-chlorobenzyl chloride, and the like.

The quaternary ammonium salts are prepared by mixing the free base and ester of a strong acid in an inert solvent. Heating may be used to facilitate the reaction, although salt formation usually takes place readily at room temperature. The quaternary ammonium salt separates directly or can be obtained by concentration of the solution.

It is also possible to convert one quaternary ammonium salt to another in which the anion is different. If the anion of the original quaternary salt forms a water-insoluble silver salt the quaternary salt will react with silver oxide in aqueous medium to form the corresponding quaternary ammonium hydroxide, the original anion being removed as a precipitate. The quaternary ammonium hydroxide solution can then be neutralized with any desired acid, weak or strong, to produce a new quaternary ammonium salt in which the anion is different from that of the original salt. In this way quaternary ammonium salts in which the anion is derived from a weak acid can be prepared.

It will thus be appreciated that Formula I not only represents the structural configuration of the bases of my invention but is also representative of the respective structural entity which is common to all of my respective compounds, whether in the form of the free bases or in the form of the acid-addition salts of the bases. I have found that by virtue of this common structural entity, the bases and their acid-addition salts have inherent pharmacodynamic activity of a type to be more fully described hereinbelow. This inherent pharmacodynamic activity can be enjoyed in useful form for pharmaceutical purposes by employing the free bases themselves or the acid-addition salts formed from pharmaceutically-acceptable acids, that is, acids whose anions are innocuous to the animal organism in effective doses of the salts so that beneficial properties inherent in the common structural entity represented by the free bases are not vitiated by side-effects ascribable to the anions.

In utilizing this pharmacodynamic activity of the salts of the invention, I prefer of course to use pharmaceutically-acceptable salts. Although water-insolubility, high toxicity, or lack of crystalline character may make some particular salt species unsuitable or less desirable for use as such in a given pharmaceutical application, the water-insoluble or toxic salts can be converted to the corresponding pharmaceutically-acceptable bases by decomposition of the salt with aqueous base as described above, or alternatively they can be converted to any desired pharmaceutically-acceptable acid-addition salt by double decomposition reactions involving the anion, for example by ion-exchange procedures.

Moreover, apart from their usefulness in pharmaceutical applications, my salts are useful as characterizing or identifying derivatives of the free bases or in isolation or purification procedures. Like all of the acid-addition salts, such characterizing or purification salt derivatives can, if desired, be used to regenerate the pharmaceutically-acceptable free bases by reaction of the salts with aqueous base, or alternatively can be converted to a pharmaceutically-acceptable acid-addition salt by, for example, ion-exchange procedures.

It will be appreciated from the foregoing that all of the acid-addition and quaternary ammonium salts of my new bases are useful and valuable compounds, regardless of considerations of solubility, toxicity, physical form, and the like, and are accordingly within the purview of the instant invention.

The novel feature of the compounds of the invention, then, resides in the concept of the bases and cationic forms of the new 1-[(benzimidazolyl)-lower-alkyl]-4-substituted-piperazines and not in any particular acid or quaternary moiety or acid anion associated with the salt forms of my compounds; rather, the acid or quaternary moieties or anions which can be associated in the salt forms are in themselves neither novel nor critical and therefore can be any acid anion or acid-like substance capable of salt formation with bases. In fact in aqueous solutions, the base form or water-soluble acid-addition salt form of the compounds of the invention both possess a common protonated cation or amminium ion.

Thus the acid-addition salts discussed above and claimed herein are prepared from any organic acid, inorganic acid (including organic acids having an inorganic group therein), or organo-metallic acid, organic mono- and polysulfonic and sulfinic acids, organic phosphonic and phosphinic acids, organic acids of arsenic and antimony, organic heterocyclic carboxylic, sulfonic, and sulfinic acids, acidic ion-exchange resins, and inorganic acids of any acid forming element or combination of elements. In addition, other salt-forming compounds which are acidic in their chemical properties but which are not generally considered as acids in the same sense as carboxylic or sulfonic acids are also considered to be among the numerous acids which can be used to prepare acid-addition salts of the compounds of the invention. Thus there is also comprehended acidic phenolic compounds and acidic compounds having "activated" or acidic hydrogen atoms, as for example, picrolonic acid, or barbituric acid derivatives having an acidic proton. Also comprehended as salt forming agents are so-called Lewis acids which lack a pair of electrons in the outer "electron shell" and react with basic compounds having an unshared pair of electrons to form salts, for example boron trifluoride.

Thus appropriate acid-addition salts are those derived from such diverse acids as formic acid, acetic acid, isobutyric acid, alpha-mercaptopropionic acid, malic acid, fumaric acid, succinic acid, succinamic acid, tartaric acid, citric acid, lactic acid, benzoic acid, 4-methoxybenzoic acid, phthalic acid, anthranilic acid, 1-naphthalenecarboxylic acid, cinnamic acid, cyclohexanecarboxylic acid, mandelic acid, tropic acid, crotonic acid, acetylene dicarboxylic acid, sorbic acid, 2-furancarboxylic acid, cholic acid, pyrenecarboxylic acid, 2-pyridinecarboxylic acid, 3-indoleacetic acid, quinic acid, sulfamic acid, methanesulfonic acid, isethionic acid, benzenesulfonic acid, p-toluenesulfonic acid, p-aminophenylarsinic acid, phenylstibnic acid, phenylphosphinous acid, methylphosphonic acid, phenylphosphinic acid, hydrofluoric acid, hydrochloric acid, hydrobromic acid, hydriodic acid, perchloric acid, nitric acid, sulfuric acid, phosphoric acid, hydrocyanic acid, phosphotungstic acid, molybdic acid, phosphomolybdic acid, pyrophosphoric acid, arsenic acid, picric acid, picrolonic acid, barbituric acid, boron trifluoride, and the like.

The acid-addition salts are prepared either by dissolving the free base in an aqueous solution containing the acid, or by reacting the free base and acid in an organic solvent, in which case the salt separates directly or can be obtained by concentration of the solution.

Pharmacological evaluation of the compounds of Formula I has demonstrated that they possess a variety of depressant actions on the autonomic nervous system, the cardiovascular system, and the skeletal muscular system. They depress psychomotor activity as evidenced by studies in mice in standard activity cages; they possess sedative activity as shown by the potentiation of sleeping time in mice induced by ether, thiopental sodium or hexobarbital sodium. They show skeletal muscle relaxant activity in mice in the inclined screen test. When administered to rats, they show adrenolytic activity as evidenced by antagonism of the pressor effects of epinephrine; they lower the rectal temperature in mice; they possess anti-convulsant activity in mice as evidenced by their ability to protect mice from pentylenetetrazol-induced convulsions; they lower the blood pressure in rats; and they show cardiovascular activity in dogs as evidenced by the increase in heart force. These activities indicate their usefulness as tranquilizers, sedatives, skeletal muscle relaxants, adrenolytic agents, hypothermic agents, anti-convulsants, hypotensive agents and cardiovascular agents.

Thus in psychomotor depressant activity studies in mice using the method described by Dews, Brit. J. Pharmacol. 8, 46–48 (1953), 1-[2-(1-benzimidazolyl)ethyl]-4-(2-methoxyphenyl)-piperazine, described below in Example 1, was found to have an $ED_{50}$ of 44.8±12.0 mg./kg. on oral administration, and 1-[2-(1-benzimidazolyl)-ethyl]-4-phenylpiperazine, described below in Example 2, was found to be active at 300 mg./kg. on oral administration.

In adrenolytic activity studies in rats using the procedure described by Luduena et al., Arch. int. Pharmacodyn. 122, 111–122 (1959), 1-[2-(1-benzimidazolyl)-ethyl]-4-phenylpiperazine, described below in Example 2, was found to have an $ED_{50}$ of 186 mcg./kg. on intravenous administration.

The compounds can be prepared for use by dissolving under sterile conditions a salt form of the compounds in water (or an equivalent amount of a non-toxic acid if the free base is used), or in a physiologically compatible aqueous medium such as saline, and stored in ampoules for intramuscular injection. Alternatively, they can be incorporated in unit dosage form as tablets or capsules for oral administration or in combination with suitable adjuvants such as calcium carbonate, starch, lactose, talc, magnesium stearate, gum acacia, and the like. Still further the compounds can be formulated for oral administration in aqueous alcohol, glycol, or oil solution or oil-water emulsions in the same manner as conventional medicinal substances are prepared.

The chemical structures of the compounds of the invention are established by their mode of synthesis and are corroborated by the correspondence between calculated values for the elements and values found by chemical analysis.

The following examples will further illustrate specific embodiments of the invention without the latter being limited thereto.

EXAMPLE 1

1-[2-(1-benzimidazolyl)ethyl] - 4 - (2-methoxyphenyl) piperazine [I: Het is 1-benzimidazolyl; Y is $CH_2CH_2$; R is 2-$CH_3OC_6H_4$]

A mixture of 5 g. (0.318 mole) of 2-chloronitrobenzene and 61 g. (1.0 mole) of ethanolamine was heated under reflux for five minutes in a 500 ml. flask equipped with a thermometer, reflux condenser, and a stirrer. The reaction mixture was then cooled to room temperature and poured into an ice-water mixture, and the precipitated solid was collected, dried and recrystallized from aqueous ethanol to give 37 g. of 2-nitro-N-(2-hydroxyethyl) aniline, M.P. 74–78° C. (uncorr.).

Thirty-one grams of the above 2-nitro-N-(2-hydroxyethyl)aniline (0.17 mole) were suspended in 100 ml. of benzene, and the mixture was heated to the boiling point. To the warm solution was added dropwise over a period of about one hour 47 g. (0.4 mole) of thionyl chloride. When addition was complete, the solvent was removed under reduced pressure and the residual oil taken into ethanol and diluted with water. The solid which separated was collected, dried, and recrystallized from ethanol giving 26 g. of 2-nitro-N-(2-chloroethyl)aniline, M.P. 57–59° C. (uncorr.)

The above 2-nitro-N-(2-chloroethyl)aniline (10.0 g., 0.05 mole) and 19.2 g. (0.1 mole) of 1-(2-methoxyphenyl)piperazine were warmed briefly to 145° C. and the mixture allowed to cool. The partially solid reaction mixture was stirred with ice water, and the solid collected and recrystallized from ethanol giving 11.5 g. of 1-[2-(2-nitrophenylamino)ethyl]-4-(2-methoxyphenyl)piperazine, M.P. 116.5–119.5° C. (uncorr.)

Eleven grams (0.031 mole) of the above 1-[2-(2-nitrophenylamino)ethyl]-4-(2-methoxyphenyl)piperazine were dissolved in 250 ml. of ethanol, and reduced over 10% palladium-on-charcoal under a hydrogen pressure of about 45 pounds p.s.i. When reduction was complete, the catalyst was removed by filtration and the solvent evaporated under reduced pressure. The residue was crystallized from boiling hexane giving 8.3 g. of 1-[2-(2-aminophenylamino)ethyl]-4 - (2 - methoxyphenyl)piperazine, M.P. 110–114° C.

Seven grams (0.02 mole) of the above 1-[2-(2-aminophenylamino)ethyl]-4-(2-methoxyphenyl)piperazine were refluxed for four and a half hours with 70 ml. of formic acid. The solvent was then removed in vacuo and the residual gum triturated with dilute sodium hydroxide. The supernatant was decanted and the gum taken into ethanol and diluted with a large volume of water. The gum which separated gradually solidified and was collected and recrystallized from ethyl acetate giving 2.2 g. of 1-[2-(1- benzimidazolyl)ethyl] - 4 - (2-methoxyphenyl)piperazine, M.P. 121.5–122.6° C. (corr.).

1-[2-(1-benzimidazolyl)ethyl] - 4 - (2-methoxyphenyl) piperazine can be reacted with hydriodic acid to form 1-[2-(1 - benzimidazolyl)ethyl]-4 - (2 - methoxyphenyl) piperazine hydriodide, useful as a characterizing intermediate.

1-[2-(1-benzimidazolyl)ethyl] - 4 - (2-methoxyphenyl) piperazine in the form of its hydriodide salt, can be converted to the hydrochloride salt by passing an aqueous solution of the former over an ion-exchange resin saturated with chloride ions.

1 - [2 - (1-benzimidazolyl)ethyl]-4-(2-methoxyphenyl) piperazine can be converted to its hydriodide salt and the latter recrystallized for purification purposes from an appropriate organic solvent. On suspension of the hydriodide in dilute aqueous sodium hydroxide, extraction of the suspension with chloroform, and removal of the chloroform from the extracts, 1-[2-(1-benzimidazolyl) ethyl]-4-(2-methoxyphenyl)piperazine can be recovered in purified free base form.

EXAMPLE 2

1-[2-(1-benzimidazolyl)ethyl]-4-phenylpiperazine
[I: Het is 1-benzimidazolyl; Y is $CH_2CH_2$; R is $C_6H_5$]

Twelve grams (0.06 mole) of 2 - nitro - N - (2-chloroethyl)aniline and 19.5 g. (0.12 mole) of 1-phenylpiperazine were heated on a hot plate to 150° C. for five minutes, and the mixture allowed to cool to room temperature. The solid mass was broken up in cold water, filtered and recrystallized from ehanol giving 15.8 g. of 1-[2-(2-nitrophenylamino)ethyl]-4 - phenylpiperazine, M.P. 114–116° C. (uncorr.).

The latter (3.3 g., 0.01 mole), dissolved in ethanol, was reduced with hydrogen over palladium oxide under a hydrogen pressure of about 36 pounds p.s.i. using the manipulative procedure described above in Example 1. The product was recrystallized from hexane giving 2.1 g. of 1-[2-(2-aminophenylamino)ethyl]-4-phenylpiperazine, M.P. 77.6–78.0° C. (corr.).

Eight grams (0.03 mole) of the above 1-[2-(2-aminophenylamino)ethyl]-4-phenylpiperazine were refluxed with 80 ml. of 98% formic acid using the manipulative procedure described above in Example 1. The crude product was recrystallized from ethyl acetate giving 5.5 g. of 1-[2 - (1 - benzimidazolyl)ethyl]-4-phenylpiperazine, M.P. 121–122.6° C.

EXAMPLE 3

1-[2-(2-benzimidazolyl)ethyl]-4-phenylpiperazine
[I: Het is 2-benzimidazolyl; Y is $CH_2CH_2$; R is $C_6H_5$]

Acrylonitrile (17.5 g., 0.33 mole) was added over a period of ninety minutes to 48.6 g. (0.3 mole) of 1-phenylpiperazine while maintaining the temperature below 35° C. The reaction mixture was stirred for one hour at 35° C., heated to boiling for one hour, and the excess acrylonitrile removed under reduced pressure. The residue, on cooling, solidified and was collected giving 63 g. of 1-(2-cyanoethyl)-4-phenylpiperazine, M.P. 66–69° C. (corr.).

The above 1-(2-cyanoethyl)-4-phenylpiperazine (21.5 g., 0.1 mole) was dissolved in 500 ml. of chloroform containing 5.9 ml. of absolute ethanol, and the solution saturated with anhydrous hydrogen chloride. The reaction mixture was taken to dryness under reduced pressure while maintaining the temperature below 20° C. The residual solid was dissolved in 500 ml. of tetrahydrofuran, and the mixture treated with 10.8 g. (0.08 mole) of o-phenylenediamine. The mixture was allowed to stand at room temperature for two hours, refluxed for one and a half hours, poured into water, and the mixture rendered alkaline with solid potassium hydroxide. On addition of ether, a solid separated which was collected and dried giving 35 g. of crude product. The latter was recrystallized from ethanol giving 2 g. of 1-[2-(2 - benzimidazolyl) ethyl]-4-phenylpiperazine, M.P. 200.5–202.9° C. (corr.).

EXAMPLES 4–26

By reacting 2-nitro-N-(2-chloroethyl)aniline with an appropriate 1-substituted-piperazine following the manipulative procedure described above in Example 1, there can be obtained the compounds of Formula I in Table 1 below where, in each instance, Het is 1-benzimidazolyl and Y is $CH_2CH_2$.

TABLE 1

| Example | R | Piperazine substituent |
|---|---|---|
| 4 | $CH_3$ | |
| 5 | $HOCH_2CH_2$ | |
| 6 | $4\text{-}ClC_6H_4$ | |
| 7 | $3\text{-}CH_3C_6H_4$ | $2\text{-}CH_3$ |
| 8 | $4\text{-}HOC_6H_4$ | |
| 9 | $2\text{-}CH_3OC_6H_4$ | $6\text{-}CH_3$ |
| 10 | $3,4\text{-}\overline{OCH_2O}C_6H_3$ | $3\text{-}CH_3$ |
| 11 | $3,4\text{-}\overline{OCH_2CH_2O}C_6H_3$ | $6\text{-}CH_3$ |
| 12 | $4\text{-}CH_3SC_6H_4$ | $2\text{-}n\text{-}C_4H_9$ |
| 13 | $4\text{-}CH_3SOC_6H_4$ | $3\text{-}CH(CH_3)_2$ |
| 14 | $4\text{-}CH_3SO_2C_6H_4$ | $2,2\text{-di-}CH_3$ |
| 15 | $4\text{-}CF_3C_6H_4$ | $2,5\text{-di-}CH_3$ |
| 16 | $4\text{-}NO_2C_6H_4$ | $2\text{-}CH_3$ |
| 17 | $3\text{-}CH_3COOC_6H_4$ | |
| 18 | $4\text{-}NH_2SO_2C_6H_4$ | |
| 19 | $3,4,5\text{-}(CH_3O)_3C_6H_2$ | |
| 20 | $2\text{-}Cl\text{-}4\text{-}CH_3C_6H_3$ | |
| 21 | $C_6H_5CH_2$ | $2,6\text{-di-}CH_3$ |
| 62 | $C_6H_5CH=CHCH_2$ | $3,6\text{-di-}CH_3$ |
| 23 | $(C_6H_5)_2CH$ | $2,5\text{-di-}n\text{-}C_3H_7$ |
| 24 | $2\text{-}C_5H_4N$ | |
| 25 | $C_6H_{11}CH_2$ | |
| 22 | $C_3H_5CH_2$ | |

EXAMPLE 27

1-[2-(1-benzimidazolyl)ethyl]-2,6-dimethylpiperazine
[I: Het is 1-benzimidazolyl; Y is $CH_2CH_2$; R is H]

By reducing the 1-[2-(1-benzimidazolyl)ethyl]-4-benzyl-2,6-dimethylpiperazine described above in Example 21 with hydrogen over a palladium-on-charcoal catalyst in an ethanol solvent, there is obtained 1-[2-(1-benzimidazolyl) ethyl]-2,6-dimethylpiperazine.

EXAMPLES 28–33

By following the manipulative procedure described above in Example 1, replacing the 2-chloronitrobenzene used therein with a molar equivalent amount of an appropriate substituted-2-chloronitrobenzene, there can be obtained the compounds of Formula I in Table 2 below where, in each instance, Het is 1-benzimidazolyl, R is $2\text{-}CH_3OC_6H_4$, and Y is $CH_2CH_2$.

TABLE 2

| Example: | Het substituent |
|---|---|
| 28 | 5-HO. |
| 29 | $6\text{-}CH_3$. |
| 30 | $4\text{-}CH_3O$. |
| 31 | $5\text{-}CH_3CO$. |
| 32 | 5-Cl. |
| 33 | $6\text{-}CH_3\text{-}7\text{-}HO$. |

EXAMPLES 34–38

By following the manipulative procedure described above in Example 3, substituting for the 1-(2-cyanoethyl)-4-phenylpiperazine used therein a molar equivalent amount of an appropriate 1-(cyano-lower-alkyl)-4-phenylpiperazine (prepared by reacting in the presence of sodium carbonate, 1-phenylpiperazine with, respectively, α-chloroacetonitrile, γ-bromobutyronitrile, γ-bromo-β-methylbutyronitrile, δ-bromovaleronitrile, and ω-oenanthylic nitrile), there can be obatined the compounds of Formula I in Table 3 below where, in each instance, Het is 2-benzimidazolyl, and R is unsubstituted phenyl.

TABLE 3

| Example: | Y |
|---|---|
| 34 | $CH_2$. |
| 35 | $(CH_2)_3$. |
| 36 | $CH_2CHCH_3CH_2$. |
| 37 | $(CH_2)_4$. |
| 38 | $(CH_2)_6$. |

I claim:

1. A compound of the formula

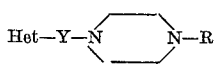

wherein Het is 1- or 2-benzimidazolyl; R is hydrogen or lower-alkyl, hydroxy-lower-alkyl, phenyl, phenyl-lower-alkyl, benzhydryl, phenyl-lower-alkenyl, cycloakyl-lower-akyl, or pyridyl; and Y is lower alkylene of from one to six carbon atoms.

2. A compound according to claim 1 wherein Het is 1-benzimidazolyl, and R is phenyl.

3. A compound according to claim 1 wherein Het is 2-benzimidazolyl, and R is phenyl.

4. 1 - [2-(1-benzimidazolyl)ethyl]-4-(2-methoxyphenyl)-piperazine according to claim 2 wherein Y is 1,2-ethylene, and R is 2-methoxyphenyl.

5. 1 - [2-(1-benzimidazolyl)ethyl]-4-phenyl-piperazine according to claim 2 wherein Y is 1,2-ethylene.

6. 1 - [2-(2-benzimidazolyl)ethyl]-4-phenyl-piperazine according to claim 3 wherein Y is 1,2-ethylene.

References Cited

UNITED STATES PATENTS

| | | | |
|---|---|---|---|
| 2,927,924 | 3/1960 | Mills | 260—268 |
| 2,935,514 | 5/1960 | Hoffmann et al. | 260—268 X |
| 3,004,978 | 10/1961 | Hunger et al. | 260—268 X |
| 3,133,069 | 5/1964 | Ash et al. | 260—268 |
| 3,293,260 | 12/1966 | Sunagawa et al. | 260—268 X |
| 3,318,880 | 5/1967 | Almirante et al. | 260—268 X |

DONALD G. DAUS, Primary Examiner

U.S. Cl. X.R.

260—240, 258, 573, 578, 646, 689; 424—250

PO-1050
(5/69)

UNITED STATES PATENT OFFICE
CERTIFICATE OF CORRECTION

Patent No. 3,472,854    Dated October 14, 1969

Inventor(s) Sydney Archer

It is certified that error appears in the above-identified patent and that said Letters Patent are hereby corrected as shown below:

Column 4, line 64, "amminium" should read --ammonium--. Column 7, line 18, "removel" should read --removal--; line 32, "ehanol" should read --ethanol--. Column 8, line 28, the Example numbered "62" should be renumbered --22--; line 32, the Example numbered "22" should be renumbered --26--; line 73, "obatined" should read --obtained--. Column 9, lines 15 and 16, Claim 1, "cycloakyl-lower-akyl" should read --cycloalkyl-lower-alkyl--.

SIGNED AND
SEALED

JUN 2 1970

(SEAL)
Attest:

Edward M. Fletcher, Jr.
Attesting Officer

WILLIAM E. SCHUYLER, JR.
Commissioner of Patents